United States Patent [19]

Jolles

[11] 3,719,656
[45] March 6, 1973

[54] NEW CYCLOPEPTIDES
[75] Inventor: Georges Jolles, Sceaux (Hauts-de-Seine), France
[73] Assignee: Rhone-Poulenc S.A., Paris, France
[22] Filed: Dec. 24, 1969
[21] Appl. No.: 888,045

Related U.S. Application Data
[63] Continuation-in-part of Ser. No. 770,436, Oct. 24, 1968, abandoned.

[30] Foreign Application Priority Data
Oct. 25, 1967 France..............................67125842
March 19, 1968 France..............................68,44421
Nov. 12, 1967 France..............................6781425

[52] U.S. Cl..............................260/112.5, 424/177
[51] Int. Cl..............................C07c 103/52
[58] Field of Search ....260/112.5; 424/121, 122, 177

[56] References Cited

UNITED STATES PATENTS 3,365,362   1/1968   Mancy et al..........................424/121

Primary Examiner—Elbert L. Roberts
Attorney—Stevens, Davis, Miller & Mosher

[57] ABSTRACT

Cyclopeptides having antitubercular activity derived from antibiotics of the formula: R-cyclopeptide A wherein cyclopeptide A designates a nonapeptide residue of the formula:

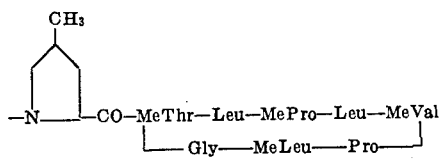

in which MePro signifies L-trans-4-methyl-proline; MeThr signified L-N-methylthreonine; MeVal signifies L-N-methylvaline; MeLeu signifies D-N-methylleucine; Pro signifies L-proline; Gly signifies glycine, and Leu signifies L-leucine, and R represents hydrogen or an alkanoyl, alkenoyl, alkadienoyl, alkoxycarbonyl, aroyl, aralkanoyl, arylsulphenyl, arylsulphinyl, aryl sulphonyl, cycloalkylcarbonyl, heterocyclyclcarbonyl or heterocyclylakanoyl radical, or a residue of a linear or cyclic peptide radical attached through a carbonyl group to the nitrogen atom of the L-trans-4-methyl-proline grouping the the side chain of the cyclopeptide A, and non-toxic acid addition and quaternary ammonium salts thereof, possess antitubercular activity and activity against gram-positive and gram-negative microorganisms.

4 Claims, No Drawings

NEW CYCLOPEPTIDES

This invention relates to new therapeutically useful cyclopeptides and acid addition and quaternary ammonium slats thereof, to processes for their preparation and pharmaceutical compositions containing them. This application is a Continuation-in-part of my application Ser. No. 770,436 filed October 24, 1968 and entitled "New Cyclopeptides," and now abandoned.

The new cyclopeptides of the present invention are those of the general formula:

R-cyclopeptide A    I wherein cyclopeptide A designates a nonapeptide residue of which the structure corresponds to the formula:

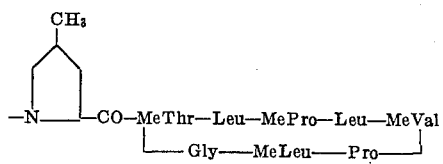

in which MePro signifies L-trans-4-methyl-proline; MeThr signifies L-N-methylthreonine; MeVal signifies L-N-methylvaline; MeLeu signifies D-N-methylleucine; Pro signifies L-proline; Gly signifies glycine, and Leu signifies L-leucine, and R represents a hydrogen atom or a radical R' which is an alkanoyl, alkenoyl, alkadienoyl, alkoxycarbonyl, aroyl, aralkanoyl, arylsulphenyl, arylsulphinyl, arylsulphonyl, cycloalkylcarbonyl, heterocyclylcarbonyl or heterocyclylalkanoyl radical, or a residue of a linear or cyclic peptide radical attached through a carbonyl group to the nitrogen atom of the L-trans-4-methyl-proline grouping of the side chain of the cyclopeptide A, and acid addition and quaternary ammonium salts thereof.

In the foregoing definition of R', the alkyl, alkenyl or alkadienyl groups of the alkanoyl, alkenoyl, alkadienoyl, aralkanoyl or heterocyclylalkanoyl radicals are linear or branched chains containing one to 50 carbon atoms (preferably one to 18 carbon atoms), optionally substituted by one or more halogen atoms or amino or alkylthio groups containing one to five carbon atoms, and the alkyl groups of alkoxycarbonyl radicals containing one to 15 carbon atoms and may be substituted by a dialkylamino group in which each alkyl portion contains one to five carbon atoms, the aromatic groups of the aroyl, aralkanoyl, arylsulphenyl, arylsulphinyl or arylsulphonyl radicals represent a benzene or naphthalene nucleus which is optionally substituted by one or more alkyl, hydroxy, benzoyl, dialkylamino, alkanoylamino or nitro groups, with the alkyl and the alkyl portions of the other radicals containing one to 12 carbon atoms, the heterocyclic groups of the heterocyclylcarbonyl or heterocyclylalkanoyl radicals represent mononuclear or polynuclear heterocycles containing one or more hetero atoms selected from nitrogen, oxygen and sulphur atoms (e.g., pyrrolyl, pyrrolidinyl and phenthiazinyl) and optionally substituted by one or more alkyl or nitro groups, the cycloalkyl groups of the cycloalkylcarbonyl radicals represent cycloalkyl radicals having five or six carbon atoms optionally substituted by one or more amino groups, the residues of the linear or cyclic peptide radicals contain 2 to 15 aminoacids, and the amino groups present as substituents in the alkyl, alkenyl or cycloalkyl portions of the radicals defined above, and the amino groups of the linear or cyclic peptide radicals, may be optionally substituted by one or more alkyl, alkanoyl, aralkyl, alkoxycarbonyl, aralkoxycarbonyl or alkoxyaralkoxycarbonyl groups, with the alkyl radicals and the alkyl portions of the other radicals containing one to 30 carbon atoms.

Examples of radicals represented by the symbol R' are N-α-acetyl-N-ε-benzyloxycarbonyl-lysyl, N-benzyl-N-methyl-valyl, N-benzyloxycarbonylvalyl, N-benzyloxycarbonyl-glycyl, N-benzylsarcosyl, N-decanoyl-valyl, N-benzyl-N-methyl-methionyl, N-benzyloxycarbonyl-phenylglycyl, N-hexyl-N-methyl-valyl, N-benzyl-N-methyl-alanyl, N-benzyl-N-methyl-phenylalanyl, N-hexylvalyl, N-benzyl-N-methyl-leucyl, N,N-diheptylglycyl, N-t.-butyloxycarbonyl-valyl, N-α-palmitoyl-N-ε-benzyloxycarbonyl-lysyl, N-α-pelargo-nyl-N-ε-benzyloxycarbonyl-lysyl, N-α-6-methyloctanoyl-N-γ-benzyloxycarbonyl-α,γ-diaminobutyryl-threonyl-N-γ-benzyloxycarbonyl-α,γ-diaminobutyryl-N-methyl-valyl, N-stearoyl-valyl, N-stearoyl-N-methyl-valyl, methionyl, N-acetyl-lysyl, valyl, N-α-6-methyloctanoyl-α,γ-diaminobutyryl-threonyl-α,γ-diaminobutyryl-N-methyl-valyl, N-palmitoyl-lysyl, N-pelargonyl-lysyl, N-methyl-p-dimethylaminophenylalanyl, undec-10-enoyl, 1-methyl-4-nitro-2-pyrrolylcarbonyl, palmitoyl, undecanoyl, dodecanoyl, 6-methyloctanoyl, benzoyl, isonicotinoyl, salicyloyl, decanoyl, 4-p-methoxybenzyloxycarbonylamino-cyclohexylcarbonyl, (10-methyl-3phenthiazinyl)acetyl, 2-(3-benzoylphenyl)propionyl, N-α-6-methyloctanoyl-N-γ-benzyloxycarbonyl-α,γ-diaminobutyryl-threonyl-N-γ-benzyloxycarbonyl-α,γ-diaminobutyryl, N-α-palmitoyl-N-γ-benzyloxycarbonyl-α,γ-diaminobutyryl, N-α-6-methyloctanoyl-N-γ-benzyl-oxycarbonyl-α,γ-diaminobutyryl, heptanoyl, stearoyl, n-butyryl, sorboyl, 11-1'-pyrrolidinyl-undecanoyl, 2-1'-pyrrolidinyl-hexanoyl, 6-1'-pyrrol-idinyl-hexanoyl, 11-diethylamino-undecyloxycarbonyl, decyloxycarbonyl, N-α-6-methyloctanoyl-α,γ-diaminobutyryl-threonyl-α,γ-diaminobutyryl, N-α-6-methyloctanoyl-α,γ-diaminobutyryl, 4-amino-cyclohexylcarbonyl, trichloroacetyl, o-nitrophenylsulphenyl, 1-dimethylamino-5-naphthalenesulphonyl, toluene-p-sulphonyl, p-acetylaminobenzenesulphonyl, N-undecyl-N-methyl-valyl, N-dodecyl-N-methyl-valyl, N-tridecyl-N-methyl-valyl and N-tetradecyl-N-methyl-valyl.

1. According to a feature of the invention, the cyclopeptide of general Formula (I) wherein R represents a hydrogen atom, i.e., cyclopeptide A, is obtained by hydrolysis of the antibiotic designated by the number 11,072 R.P. by treatment with an acid in an organic or aqueous-organic solution.

Antibiotic 11,072 R.P. and its preparation have been described in British Pat. No. 966,124 granted on an application filed by Rhone-Poulenc S.A. on June 4, 1962.

It has been established that this antibiotic has the structure shown below:

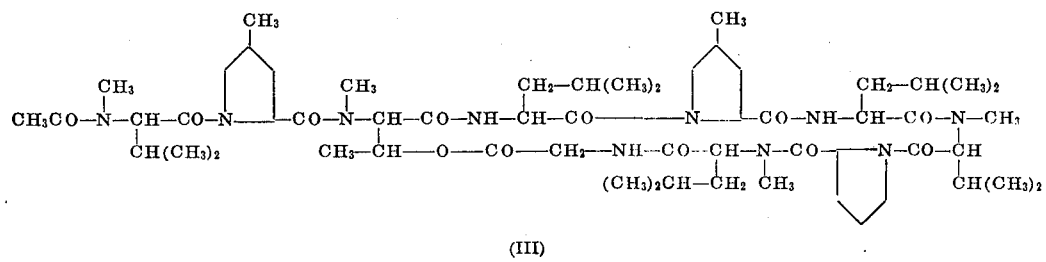

(III)

Inorganic acids (for example hydrochloric and sulphuric acids) or organic acids (for example trifluoroacetic acid) at various concentrations are suitable for hydrolysis of 11,072 R.P., but hydrochloric acid is preferably used at normalities of between 1N and 6N. Solvents which may generally be employed in the process are alcohols containing one to four carbon atoms, ethers such as dioxan or tetrahydrofuran, esters such as ethyl acetate, or a mixture of two or more of such solvents. Methanol containing anhydrous hydrogen chloride is preferably used for the hydrolysis.

The concentration in the medium of antibiotic 11,072 R.P. may vary from 1 to 20 percent.

Hydrolysis is carried out at a temperature of between 0° and 50° C. and the reaction time, which is a function of the temperature, may vary from 5 hours to 1 hour. The process is generally carried out at 20° C. for 2 hours.

Cyclopeptide A thus prepared may optionally be purified by the usual physical or chemical methods, for example by chromatography.

2. According to another feature of the invention, the cyclopeptides of general Formula (I) wherein R represents a radical R' as hereinbefore defined are obtained from cyclopeptide A by condensation with an acid R'-OH, or a reactive derivative thereof, by any of the known methods employed in peptide chemistry.

Examples of suitable condensation methods are those using a carbodiimide such as dicyclohexylcarbodiimide, the azide method, the activated ester method, the mixed anhydride method and the acid chloride method. In these processes, free functional groups in the radical R' which must not participate in the reaction are protected by groups capable of being subsequently removed by procedures which do not affect the rest of the molecule. Residues which can be removed by hydrolysis or by reduction are generally employed for the purpose. The amine group is preferably protected by alkoxycarbonyl groups, e.g., t.-butoxycarbonyl, aralkoxycarbonyl groups, e.g., benzyloxycarbonyl, or aralkyl groups, e.g., benzyl.

More particularly, when an acid of the general formula:

$$R''-OH \qquad (IV)$$

(wherein R'' has the same significance as R' defined above with the exclusion of alkoxycarbonyl, arylsulphenyl, arylsulphinyl and arylsulphonyl radicals) is used, the reaction is effected in an organic solvent, such as ethyl acetate, dimethylformamide, acetonitrile or methylene chloride, at a temperature of between 0° C. and 30° C. in the presence of a carbodiimide, e.g., dicyclohexylcarbodiimide.

More particularly, when an azide of the general formula:

$$R''-N_3 \qquad (V)$$

(wherein R'' is as hereinbefore defined) is used, the reaction is effected in an organic solvent such as ethyl acetate, optionally in the presence of an organic base such as triethylamine and at a temperature of between −15° C. and +25° C.

The azides of general Formula (V) are generally prepared by reaction of an alkali metal nitrite with the corresponding hydrazide in an acid medium.

More particularly, when a reactive ester of the general formula:

$$R''-X \qquad (VI)$$

(wherein R'' is as hereinbefore defined, and X represents a phenol residue or a residue of a nitrogen-containing N-hydroxylated heterocyclic compound which activates the carbonyl group in the radical R'' to which it is attached, for example N-hydroxysuccinimide, p-nitrophenol, 2,4,5-trichlorophenol or 1-hydroxypiperidine) is used, the reaction is effected in an organic solvent, e.g., ethyl acetate or dimethylformamide, in the presence of a carbodiimide, e.g., dicyclohexylcarbodiimide, at a temperature of between −15° C. and +25° C. in the optional presence of an organic base, e.g., triethylamine.

the reactive esters of Formula (VI) are generally prepared in situ according to methods known per se.

More particularly, when an acid anhydride of the general formula:

$$R''-O-CO-O-R_1 \qquad (VII)$$

(wherein R'' is as hereinbefore defined, and $R_1$ represents an alkyl radical containing one to five carbon atoms) is used, the reaction is effected in an organic solvent such as methylene chloride at a temperature between −15° C. and +20° C., optionally in the presence of an organic base such as triethylamine.

The mixed anhydrides of general Formula (VII) are generally prepared in situ by reaction of an alkyl chloroformate, e.g., ethyl or isobutyl chloroformate, with an acid of general Formula (IV) in an organic solvent, e.g., methylene chloride, in the presence of an organic base, e.g., triethylamine, and at a temperature of about −10° C.

More particularly, when an acid chloride of the general formula:

$$R''-Cl \qquad (VIII)$$

(wherein R'' is as hereinbefore defined) is used, the reaction is effected in an organic solvent, e.g., methylene chloride, optionally in the presence of an organic base, e.g., triethylamine, and at a temperature of between −15° C. and +25° C.

More particularly, for the preparation of cyclopeptides of general Formula (I) wherein R' represents an optionally substituted alkoxycarbonyl radical as hereinbefore defined, cyclopeptide A is reacted with a chloroformate of the general formula:

$$R'''\text{—O—CO—Cl} \qquad (IX)$$

wherein R''' represents an alkyl radical containing one to 15 carbon atoms which is optionally substituted by one dialkylamino radical with each alkyl group thereof containing one to five carbon atoms, in an organic solvent, e.g., methylene chloride, in the presence of an organic base, e.g., triethylamine, and at a temperature of between −15° C. and +30° C.

More particularly, for the preparation of cyclopeptides of general Formula (I) wherein R' represents an arylsulphenyl, arylsulphinyl or arylsulphonyl radical as hereinbefore defined, cyclopeptide A is reacted with a compound of the general formula:

$$R^{IV}\text{—S(O)}_n\text{—Cl} \qquad (X)$$

wherein $R^{IV}$ represents a benzene or naphthalene nucleus which is optionally substituted by one or more alkyl, hydroxy, benzoyl, dialkylamino, alkanoylamino or nitro groups, and n represents 0, 1 or 2, in an organic solvent, e.g., ethyl acetate or methylene chloride, in the presence of an organic base, e.g., triethylamine, and at the temperature of between −15° C. and +20° C.

3. A modification of the process according to (2) above comprises reacting an acid or an acid derivative of Formula (IV), (V), (VI), (VII), or (VIII) with a cyclopeptide of the general formula:

$$\begin{array}{c} R_2\text{—CH—CO—cyclopeptide A} \\ | \\ \text{NH—}R_3 \end{array} \qquad (XI)$$

wherein $R_2$ and $R_3$ are the same or different and each represents a hydrogen atom or an alkyl radical containing one to five carbon atoms, under the conditions described in respect of process (2).

Where, in the processes described under (2) and (3), the radicals R'', R''' and $R^{IV}$ of the compounds of Formulas (IV), (V), (VI), (VII), (VIII), (IX) and (X) contain protective groups, these protective groups are thereafter removed by methods known per se, such as catalytic hydrogenation or acid hydrolysis.

The new cyclopeptides of general Formula (I) may optionally be purified by physical methods (such as chromatography) or chemical methods (such as the formation of salts which are soluble in water, filtration and lyophilization of the resulting solution, followed by decomposition of the resulting product).

The cyclopeptide bases of general Formula (I) may be converted into acid addition salts or quaternary ammonium salts depending on the nature of the substituent —R. The acid addition salts may be obtained by reaction of the cyclopeptides with acids in appropriate solvents; generally, the base is solubilized in water by adding the theoretical amount of acid and the resulting solution is lyophilized. The quaternary ammonium slats may be obtained by reaction of the cyclopeptide bases with esters, optionally in an organic solvent, at room temperature or more rapidly with gentle heating.

The cyclopeptide compounds of Formula (I) and their acid addition and quaternary ammonium salts possess useful therapeutic properties. They are antibiotic agents which have a powerful anti-tubercular activity and, furthermore, have a good activity against gram-positive and gram-negative microorganisms.

They have given good results in anti-tubercular activity tests in vitro and in vivo. They have inhibited the multiplication of virulent tubercular bacilli (human strains such as $H_{37}Rv$, bovine strain and various mutants of the latter). The activity in vitro is determined by the method of dilutions in Dubos medium. Under these conditions the minimum inhibitory concentration of the cyclopeptides is between 0.005 and 1 µg./ml. The activity in vivo is determined on experimentally infected mice treated with the cyclopeptides for 3 weeks from the day following the infection. By comparing the survival times of treated and untreated mice, the minimum effective doses can be determined; they are between 50 and 300 mg./kg. p.o.

Of special interest are the cyclopeptides of general Formula (I) in which R represents an alkanoyl or alkenoyl radical which is optionally substituted by an amino or alkylthio group, or a linear peptide radical, any amino group present being optionally substituted by one or two alkyl, alkanoyl, aralkyl, alkoxycarbonyl or aralkoxycarbonyl groups. Of this class those cyclopeptides, wherein R represents an alkanoyl radical substituted by an amino group or a linear peptide radical, with the amino group(s) present being optionally substituted by one or two alkyl, alkanoyl, aralkyl, alkoxycarbonyl or aralkoxycarbonyl groups, are preferred. Of outstanding interest are those cyclopeptides of general Formula (I) wherein R represents the valyl or methionyl group optionally substituted on the nitrogen atom by alkyl (preferably methyl and/or an alkyl group containing 11 to 18 carbon atoms), aralkyl (preferably benzyl) or alkanoyl (e.g., stearoyl) groups. Of greatest interest are (N-benzyl-N-methyl-DL-valyl)-cyclopeptide A, (N-benzyl-N-methyl-L-valyl)-cyclopeptide A, (N-benzyl-N-methyl-D-valyl)-cyclopeptide A, (N-benzyl-N-methyl-L-methionyl)-cyclopeptide A, (N-stearoyl-L-valyl)-cyclopeptide A and (N-dodecyl-N-methyl-D-valyl)-cyclopeptide A — especially the first and last compounds — and acid addition and quaternary ammonium salts thereof.

For therapeutic purposes, the cyclopeptides of general Formula (I) may be employed as such or in the form of non-toxic acid addition salts, i.e., salts containing anions which are relatively innocuous to the animal organism in therapeutic doses of the salts (for example hydrochlorides, sulphates, nitrates, phosphates, acetates, propionates, succinates, benzoates, fumarates, maleates, tartrates, methanesulphonates, benzenesulphonates, theophylline-acetates, salicylates, phenolphthalinates or methylene-bis-β-hydroxynaphthoates), so that the beneficial physiological properties inherent in the cyclopeptide bases are not vitiated by side-effects ascribable to those anions. They may also be employed in the form of non-toxic quaternary ammonium salts obtained by reaction of the cyclopeptides with organic halides, e.g., methyl, ethyl, allyl or benzyl chloride, bromide or iodide, or other reactive esters, e.g., methyl- or ethyl- sulphates, benzene-sulphonates or toluene-p-sulphonates.

The following Examples, in which the yields given are related to the theoretical yield, illustrate the invention. The Rf values of the products are determined by thin layer chromatography on silica gel.

EXAMPLE 1

The antibiotic peptide 11,072 R.P. (150 g.) obtained as described in British Pat. Specification No. 966,124 is dissolved in 4.5N hydrochloric acid in methanol (1,320 cc.). The mixture is stirred for 2 hours at 20° C. and then concentrated to dryness under reduced pressure (25 mm.Hg). The residue is extracted with methanol (2 × 250 cc.). The methanol extracts on evaporation yield an amorphous residue which is dissolved in a mixture of chloroform-methanol (95-5 by volume). The resulting solution is poured into a column 11 cm in diameter containing silica gel (2 kg.). Elution is effected with the same solvent. Fractions of 640 cc. are collected. Fractions 10 to 16 yield the chromatographically pure cyclopeptide A (123.3 g.) in a 95.5 percent yield.

Rf = 0.55 (silica gel; 1,2-dichloroethane-methanol, 65–35 by volume) $[\alpha]_D^{22} = -62°(c= 0.5 :$ methanol).

EXAMPLE 2

Cyclopeptide A (3.35 g.) is dissolved in ethyl acetate (70 cc.) N-α-Acetyl-N-ε-benzyloxycarbonyl-L-lysine. (1.13 g.) is added. The mixture is cooled in an ice bath and dicyclohexylcarbodiimide (0.8 g.) is added. The mixture is stirred for 2 hours while externally cooling it in an ice bath, and then overnight at 20° C. Glacial acetic acid (5 drops) is added and the insoluble material formed is then filtered off. The precipitate is washed with ethyl acetate, and the organic phases are combined and then concentrated to dryness under reduced pressure (25 mm.Hg). The residue is taken up in ethyl acetate (10 cc.) and the resulting solution is successively washed with a 2 percent solution of sodium bicarbonate, then with N hydrochloric acid and finally with distilled water. The organic phase is dried over anhydrous sodium sulphate and then filtered. The filtrate is concentrated to dryness under reduced pressure (25 mm.Hg).

The crude residue (3.14 g.) is charged into a column 3 cm. in diameter containing silica gel (75 g.). The column is successively eluted with benzene, 9–1 (by volume) and 5–5 (by volume) mixtures of benzene-ethyl acetate, ethyl acetate, and 95–5 (by volume), 90–10 (by volume) and 75–25 (by volume) mixtures of ethyl acetate-methanol. The fractions eluted with ethyl acetate and with the 95–5 and 90–10 mixtures of ethyl acetate-methanol are combined and concentrated to dryness under reduced pressure (25 mm.Hg).

(N-α-Acetyl-N-ε-benzyloxycarbonyl-L-lysyl)-cyclopeptide A (2.13 g.) is thus obtained in a 48.5 percent yield.

N % = 12.43 (theory : 12.20)
$[\alpha]_D^{20} = -67.6°$ (c = 0.5; methanol)
Rf = 0.73 (silica gel; 1,2-dichloroethane-methanol, 8–2 by volume).

The following products are prepared in the same manner, starting with appropriate starting materials:

(N-benzyl-N-methyl-L-valyl)-cyclopeptide A
C % = 64.13 (theory : 64.30), H % = 8.53 (theory : 8.67)
Rf = 0.67 (silica gel ; 1,2-dichloroethane-methanol, 8–2 by volume).

(N-benzyl-N-methyl-D-valyl)-cyclopeptide A hydrochloride
N % = 11.50 (theory : 11.69) Cl % = 2.95 (theory : 2.96)
Rf = 0.87 (silica gel : 1,2-dichloroethane-methanol, 65–35 by volume).

(N-benzyl-N-methyl-DL-valyl)-cyclopeptide A methanesulphonate
N% = 10.59 (theory : 11.13) S % = 2.65 (theory : 2.55)
Rf = 0.74 (silica gel : 1,2-dichloroethane-methanol, 8–2 by volume).

(N-benzyloxycarbonyl-L-valyl)-cyclopeptide A
N % = 11.93 (theory : 11.76)
$[\alpha]_D^{20} = -73.2°$ (c = 0.5, methanol)
Rf = 0.85 (silica gel : 1,2-dichloroethane-methanol, 65–35 by volume).

(N-benzyloxycarbonylglycyl)-cyclopeptide A
N % = 11.87 (theory : 12.18)
Rf = 0.40 (silica gel : 1,2-dichloroethane-methanol, 88–12 by volume).

(N-benzylsarcosyl)-cyclopeptide A methanesulphonate
N % = 10.81 (theory : 11.52) S % = 2.89 (theory : 2.64)
Rf = 0.77 (silica gel : 1,2-dichloroethane-methanol, 65–35 by volume).

(N-decanoyl-L-valyl)-cyclopeptide A
N % = 11.60 (theory : 11.56)
Rf = 0.83 (silica gel : 1,2-dichloroethane-methanol, 8–2 by volume).

(undec-10-enoyl)-cyclopeptide A
C % = 64.33 (theory : 64.08) N % = 10.95 (theory : 11.21)
Rf = 0.58 (silica gel : 1,2-dichloroethane-methanol, 8–2 by volume).

(1-methyl-4-nitro-2-pyrrolylcarbonyl)-cyclopeptide A
N % = 13.81 (theory : 13.87)
Rf = 0.84 (silica gel : 1,2-dichloroethane-methanol, 8–2 by volume).

(N-benzyl-N-methyl-L-methionyl)-cyclopeptide A hydrochloride
N % = 11.62 (theory : 11.39) S % = 3.12 (theory : 2.61)
Rf = 0.65 (silica gel : n-butanol-acetic acid-water, 4–1– by volume).

(N-benzyloxycarbonyl-L-phenylglycyl)-cyclopeptide A
N % = 11.11 (theory : 11.42)
Rf = 0.85 (silica gel : 1,2-dichloroethane-methanol, 65–35 by volume).

(N-hexyl-N-methyl-L-valyl)-cyclopeptide A hydrochloride
C % (for the base) = 63.45 (theory : 63.40)
H % (for the base) = 9.12 (theory : 9.24)
N % (for the base) = 12.03 (theory : 12.12)
Rf = 0.53 (silica gel : 1,2-dichloroethane-methanol, 8–2 by volume).

(N-benzyl-N-methyl-L-alanyl)-cyclopeptide A hydrochloride
N % = 12.20 (theory : 11.98) Cl % = 3.3 (theory : 3.03)
Rf = 0.85 (silica gel : 1,2-dichloroethane-methanol, 65–35 by volume).

(N-benzyl-N-methyl-L-phenylalanyl)-cyclopeptide A
N % = 11.50 (theory : 11.58)
Rf = 0.77 (silica gel : 1,2-dichloroethane-methanol, 8–2 by volume).

palmitoyl-cyclopeptide A
  C % = 64.45 (theory : 65.24) H % = 9.41 (theory : 9.51)
  N % = 10.30 (theory : 10.53)
  Rf = 0.77 (silica gel : 1,2-dichloroethane-methanol, 8-2 by volume).

undecanoyl-cyclopeptide A
  C % = 64.78 (theory : 64.0) H % = 9.28 (theory : 9.21)
  N % = 10.9 (theory : 11.18)
  Rf = 0.52 (silica gel : 1,2-dichloroethane-methanol, 8-2 by volume).

dodecanoyl-cyclopeptide A
  N % = 11.1 (theory : 11.05)
  Rf = 0.78 (silica gel : 1,2-dichloroethane-methanol, 8-2 by volume).

[L(+)-6-methyloctanoyl]-cyclopeptide A
  C % = 63.63 (theory : 63.41) H % = 8.50 (theory : 9.03)
  N % = 11.12 (theory : 11.47)
  Rf = 0.77 (silica gel : 1,2-dichloroethane-methanol, 8-2 by volume).

benzoyl-cyclopeptide A
  N % = 11.88 (theory : 11.86)
  Rf = 0.85 (silica gel : 1,2-dichloroethane-methanol, 65-35 by volume).

isonicotinoyl-cyclopeptide A
  N % = 13.14 (theory : 13.17)
  Rf = 0.83 (silica gel : 1,2-dichloroethane-methanol, 65-35 by volume).

salicyloyl-cyclopeptide A
  N % = 11.97 (theory : 11.68)
  Rf = 0.80 (silica gel : 1,2-dichloroethane-methanol, 65-35 by volume).

decanoyl-cyclopeptide A
  C % = 63.98 (theory : 63.69) H % = 9.41 (theory : 9.15)
  Rf = 0.70 (silica gel : 1,2-dichloroethane-methanol, 65-35 by volume).

(N-hexyl-L-valyl)-cyclopeptide A hydrochloride
  N % (for the base) = 12.25 (theory : 12.27)
  Rf = 0.37 (silica gel : 1,2-dichloroethane-methanol, 8-2 by volume).

(N-benzyl-N-methyl-L-leucyl)-cyclopeptide A
  N % = 11.99 (theory : 11.91)
  Rf = 0.72 (silica gel : 1,2-dichloroethane-methanol, 8-2 by volume).

(4-p-methoxybenzyloxycarbonylamino-cyclohexylcarbonyl)-cyclopeptide A
  N % = 10.8 (theory : 11.22)
  Rf = 0.76 (silica gel : 1,2-dichloroethane-methanol, 8-2 by volume).

[(10-methyl-3-phenthiazinyl)acetyl]-cyclopeptide A
  N % = 11.3 (theory : 11.56) S % = 2.53 (theory : 2.64)
  Rf = 0.56 (silica gel : 1,2-dichloroethane-methanol, 8-2 by volume).

[2-(3-benzoylphenyl)propionyl]-cyclopeptide A
  N % = 10.45 (theory : 10.55)
  Rf = 0.57 (silica gel : 1,2-dichloromethane-methanol, 8-2 by volume).

(N,N-diheptylglycyl)-cyclopeptide A
  N % = 11.43 (theory : 11.56)
  Rf = 0.74 (silica gel : 1,2-dichloroethane-methanol, 8-2 by volume).

EXAMPLE 3

N-t.-butyloxycarbonyl-L-valine (0.21 g.) is dissolved in methylene chloride (25 cc.) to which triethylamine (0.14 cc.) has been added. The mixture is cooled to −7° C., ethyl chloroformate (0.1 cc.) is added and the mixture then stirred for 35 minutes at −5° C. A solution of cyclopeptide A (0.96 g.) in methylene chloride (10 cc.), to which triethylamine (0.14 cc.) has been added, is then added. The mixture is stirred for 18 hours with external cooling by means of an ice bath, and concentrated to dryness under reduced pressure (25 mm.Hg). Crude (N-t.-butyloxycarbonyl-L-valyl)-cyclopeptide A (0.97 g.) is obtained in an 84 percent yield. The product is dissolved in ethyl acetate. The solution is filtered and then washed with water, and concentrated to dryness under reduced pressure (25 mm.Hg). Pure (N-t.-butyloxy-carbonyl-L-valyl)-cyclopeptide A (0.73 g.) is thus obtained in a 63 percent yield.
  N % = 11.7 (theory : 12.1)
  Rf = 0.70 (silica gel : 1,2-dichloroethane-methanol, 8-2 by volume).

EXAMPLE 4

N-α-L(+)-6-methyloctanoyl-N-γ-benzyloxycarbonyl-L-α,γ-diaminobutyryl-L-threonyl-N-γ-benzyloxycarbonyl-L-α,γ-diaminobutyrylhydrazide (2.5 g.) [prepared according to the method described by K. Vogler et coll, Helv. 48, 1161 (1965)] is dissolved in glacial acetic acid (75 cc.) and N hydrochloric acid (7.08 cc.). The mixture is cooled to +2° C. and an ice-cold solution of sodium nitrite (0.232 g.) in water (2.5 cc.) is added. The mixture is stirred for 15 minutes at 0° C., poured into a separating funnel cooled to 0° C., and an ice-cold 5 percent solution of sodium bicarbonate (200 cc.) is then added. The organic phase is decanted and successively washed 5 times with an ice-cold 5 percent sodium bicarbonate solution (60 cc.). The washing liquors are again extracted with ice-cold ethyl acetate (100 cc.). The organic extracts are themselves washed with an ice-cold 5 percent solution of sodium bicarbonate. All the organic phases are combined and then dried over anhydrous sodium sulphate at a temperature of between 0° C. and 2° C. The solution is filtered rapidly, and the solution of N-α-L(+)-6-methyloctanoyl-N-γ-benzyloxycarbonyl-L-α,γ-diaminobutyryl-L-threonyl-N-γ-benzyloxycarbonyl-L-α,γ-diaminobutyrylazide thus obtained is added to an ice-cold solution of cyclopeptide A (3.23 g.) in ethyl acetate (100 cc.) to which triethylamine (0.47 cc.) has been added. The mixture is stirred for 18 hours at a temperature of between 0° C. and 2° C., and then for 48 hours at 20° C.

The resulting solution is concentrated to dryness under reduced pressure (25 mm.Hg). The residue is taken up in water (100 cc.) and triturated until the residue becomes a powder. The mixture is filtered and then dried under reduced pressure (0.3 mm.Hg) in the presence of phosphorus pentoxide. The resulting product is taken up in acetone (20 cc.). A slight amount of insoluble matter is filtered off and the filtrate concentrated to dryness under reduced pressure (20 mm.Hg).

(N-α-L-(+)-6-methyl-octanoyl-N-γ-benzyloxycarbonyl-L-α,γ-diaminobutyryl-L-threonyl-N-γ-benzyloxycarbonyl-L-α,γ-diaminobutyryl)-cyclopeptide A (4.44 g.) is thus obtained in a 79 percent yield.
  N % = 11.54 (theory : 11.75)
  Rf = 0.92 (silica gel :1,2-dichloroethane-methanol, 1-1 by volume).

The following products are prepared in the same manner, starting with appropriate starting materials:
(N-α-palmitoyl-N-ε-benzyloxycarbonyl-L-lysyl)-cyclopeptide A
  N % = 10.51 (theory : 10.56) C % = 64.65 Theory : 65.03)
  H % = 8.89 (theory : 9.05)
  Rf = 0.75 (silica gel : 1,2-dichloroethane-methanol, 8–2 by volume).
(N-α-pelargonyl-N-γ-benzyloxycarbonyl-L-lysyl)-cyclopeptide A
  N % = 11.08 (theory : 11.32) C % = 63.18 (theory : 63.55)
  H % = 8.41 (theory : 8.66)
  Rf = 0.59 (silica gel : 1,2-dichloroethane-methanol, 8–2 by volume).
(N-α-palmitoyl-N-γ-benzyloxycarbonyl-L-α,γ-diaminobutyryl)-cyclopeptide A
  N % = 10.59 (theory : 10.76) C % = 65.02 (theory : 64.63)
  H % = 8.82 (theory : 8.95)
  Rf = 0.68 (silica gel : 1,2-dichloroethane-methanol, 8–2 by volume).
(N-α-L(30)-6-methyloctanoyl-N-γ-benzyloxycarbonyl-L-α,γ-diaminobutyryl)-cyclopeptide A
  N % = 11.13 (theory : 11.56) C % = 63.00 (theory : 63.08)
  H % = 8.51 (theory : 8.55)
  Rf = 0.55 (silica gel : 1,2-dichloroethane-methanol, 8–2 by volume).

EXAMPLE 5

Following the procedure of Example 4 and starting with N-α-L(+)-6-methyloctanoyl-N-γ-benzyloxycarbonyl-L-α,γ-diaminobutyryl-L-threonyl-N-γ-benzyloxycarbonyl-L-α,γ-diaminobutyrylhydrazide (2.5 g.), glacial acetic acid (75 cc.), N hydrochloric acid (7.08 cc.), sodium nitrite (232 mg. dissolved in 2.5 cc. of water), (N-methyl-L-valyl)-cyclopeptide A (3.6 g. dissolved in 100 cc. of ethyl acetate to which 0.94 cc. of triethylamine has been added), (N-α-L(+)-6-methyloctanoyl-N-γ-benzyloxycarbonyl-L-α,γ-diaminobutryrl-L-threonyl-N-γ-benzyloxy-carbonyl-L-α,γ-diaminobutyryl-N-methyl-L-valyl)-cyclopeptide A (5.23 g.) is obtained in an 87.5 percent yield. This product is purified by chromatography over silica gel. There are used 50 g. of silica gel per 5 g. of product, and the product is eluted with ethyl acetate and with a 9–1 (by volume) mixture of ethyl acetate-methanol. This purification results in chromatographically pure N-α-L(+)-6-methyloctanoyl-N-γ-benzyloxycarbonyl-L-α,γ-diaminobutyryl-L-threonyl-N-γ-benzyloxycarbonyl-L-α,γ-diamino-butyryl-N-methyl-L-valyl)-cyclopeptide A (2.81 g.) in a 47 percent yield.
  N % = 11.79 (theory = 11.79)
  Rf = 0.31 (silica gel : 1,2-dichloroethane-methanol, 8–2 by volume).

The following products are prepared in the same manner:
(N-stearoyl-L-valyl)-cyclopeptide A
  N % = 10.46 (theory : 10.58)
  Rf = 0.45 (silica gel : 1,2-dichloroethane-methanol, 8–2 by volume).
(N-stearoyl-N-methyl-L-valyl)-cyclopeptide A
  N% = 10.02 (theory : 10.4)
  Rf = 0.78 (silica gel : 1,2-dichloroethane-methanol, 8–2 by volume).

EXAMPLE 6

Heptanoic acid (1.43 g.) is dissolved in dimethylformamide (5 cc.) and N-hydroxysuccinimide (0.173 g.) is then added. The mixture is cooled to −10° C. and dicyclohexylcarbodiimide (0.31 g.) is added. The mixture is stirred for one hour at −10° C., then for 2 hours at 0° C. and for 18 hours at 20° C.

The dicyclohexylurea formed is filtered off and a solution of cyclopeptide A (1.44 g.) in dimetylformamide (75 cc.), to which triethylamine (0.21 cc.) has been added, is then added to the filtrate. The mixture is then stirred for 18 hours at 20° C.

The reaction mixture is concentrated to dryness under reduced pressure (25 mm.Hg). The resulting residue is taken up in ethyl acetate (50 cc.) and successively washed with a 5 percent aqueous solution of sodium bicarbonate, with N hydrochloric acid and with water. The organic phase is dried over anhydrous sodium sulphate, filtered, and the filtrate then concentrated to dryness under reduced pressure (25 mm.Hg).

The residue is chromatographed on twenty times its weight of silica gel, eluting with mixtures of chloroform-methanol of which the methanol content is progressively increased. The heptanoyl-cyclopeptide A is eluted with a 98–2 (by volume) mixture of chloroform-methanol. The corresponding fractions are concentrated to dryness under reduced pressure (25 mm.Hg) to give heptanoyl-cyclopeptide A (0.92 g.) in a 37 percent yield.
  N % = 11.2 (theory : 11.77) C % = 62.6 (theory : 62.83)
  H % = 8.9 (theory : 8.94)
  Rf = 0.82 (silica gel : 1,2-dichloroethane-methanol, 65–35 volume).

The following products are prepared in the same manner, starting with appropriate starting materials:
stearoyl-cyclopeptide A
  C % = 65.80 (theory : 65.70) H % = 9.60 (theory : 9.62)
  Rf = 0.82 (silica gel : 1,2-dichloroethane-methanol, 65–35 by volume).
n-butyryl-cyclopeptide A
  C% = 60.9 (theory : 61.9) H% = 8.7 (theory : 8.72)
  Rf = 0.55 (silica gel : 1,2-dichloroethane-methanol, 65–35 by volume).
sorboyl-cyclopeptide A
  N% = 11.99 (theory : 11.97)
  Rf = 0.75 (silica gel : 1,2-dichloroethane-methanol, 65–35 by volume).
(11-1'-pyrrolidinyl-undecanoyl)-cyclopeptide A hydrochloride
  N% = 10.9 (theory : 11.35) Cl % = 2.65 (theory : 2.87)
  Rf = 0.60 (silica gel : 1,2-dichloroethane-methanol, 65–35 by volume).
(2-1'-pyrrolidinyl-hexanoyl)-cyclopeptide A hydrochloride
  N% = 11.81 (theory : 12.05 )
  Rf = 0.70 (silica gel : 1,2-dichloroethane-methanol, 65–35 by volume).

EXAMPLE 7

Cyclopeptide A (2.875 g.) is dissolved in dimethylformamide (10.5 cc.) and 2,4,5-trichlorophenyl N-t.- butyloxycarbonyl-L-methionate (1.28 g.) is then added. The solution is cooled to 0° C., triethylamine (0.42 cc.) is then added slowly and the mixture stirred for 18 hours at 0° C. The solution is poured into a mixture of ice (45 g.) and cyclohexane (15 cc.) to which acetic acid (0.02 cc.) has been added. A white oil is obtained which is decanted and taken up in ethyl acetate (6 cc.). On adding petroleum ether (100 cc.), a white solid is obtained which is filtered off and dried to give (N-t.-butyloxycarbonyl-L-methionyl)-cyclopeptide A (2.85 g.).

This product (1.2 g.) is taken up in a 1.8N solution of hydrogen chloride in dioxan (2.73 cc.) and kept at 20° C. for 5 hours. The mixture is concentrated to dryness under reduced pressure (25 mm.Hg). The resulting product is taken up in ethyl acetate and then chromatographed over silica gel (15 g.) contained in a column 1.2 cm. in diameter. The fractions eluted by a mixture of ethyl acetate-methanol (90–10 by volume) are combined. The solvent is evaporated under reduced pressure (25 mm.Hg). The residue is taken up in water (50 cc.) and the resulting solution is lyophilised to give (L-methionyl)-cyclopeptide A hydrochloride (0.52 g.).

S % = 2.92 (theory : 2.84)

Rf = 0.47 (silica gel : 1,2-dichloroethane-methanol, 8–2 by volume).

The following product is obtained in the same way starting with the appropriate starting materials:
(6-1'-pyrrolidinyl-hexanoyl)-cyclopeptide A hydrochloride N % = 12.05 (theory : 12.05)

Rf = 0.52 (silica gel : 1,2-dichloroethane-methanol, 65–35 by volume).

EXAMPLE 8

Cyclopeptide A (2 g.) is dissolved in methylene chloride (40 cc.) and triethylamine (0.28 cc.) is then added. The mixture is cooled to a temperature of between −5° C. and −10° C. and the following two solutions are then added simultaneously over the course of 10 minutes:
a. triethylamine (0.56 cc.) dissolved in methylene chloride (15 cc.):
b. 11-diethylamino-undecyl chloroformate hydrochloride (0.684 g.) in methylene chloride (15 cc.).

The mixture is stirred for 2 hours at 0° C. and then for 18 hours at 20° C. The reaction mixture is then washed with a 5 percent solution of sodium bicarbonate followed by a saturated solution of sodium chloride. The mixture is dried over sodium sulphate, filtered and concentrated to dryness under reduced pressure (25 mm.Hg). The resulting residue is chromatographed over silica gel (25 g.) contained in a column 1.2 cm. in diameter. The fractions eluted with 98–2 and 95–5 (by volume) mixtures of ethyl acetate-methanol are combined and concentrated to dryness under reduced pressure (25 mm.Hg). The residue is taken up in water (40 cc.) and N hydrochloric acid is then added drop-wise until pH 3 is reached. A slight amount of insoluble matter is filtered off and the filtrate is lyophilised. (11-Diethylamino-undecyloxycarbonyl)-cyclopeptide A hydrochloride (1.24 g.) is thus obtained in a 50 percent yield.

N % = 10.87 (theory : 11.07)

Rf = 0.64 (silica gel : 1,2-dichloroethane-methanol, 65–35 by volume).

The following product is prepared in the same manner:
decyloxycarbonyl-cyclopeptide A C % = 63.50 (theory : 63.08) H % = 9.10 (theory : 9.08)

N % = 11.95 (theory : 11.03)

Rf = 0.85 (silica gel : 1,2-dichloroethane-methanol, 8–2 by volume).

EXAMPLE 9

Cyclopeptide A (2.98 g.), o-nitrophenylsulphenyl chloride (0.569 g.) and triethylamine (0.42 cc.) are mixed in ethyl acetate (40 cc.) at 2° C. The mixture is stirred for 18 hours with external cooling by means of an ice-bath and is then concentrated to dryness under reduced pressure (25 mm.Hg). A crude product (3.45 g.) is obtained and this is chromatographed over silica gel (30 g.) contained in a column 2 cm. in diameter. The fractions eluted with ethyl acetate are concentrated to dryness under reduced pressure (25 mm.Hg) to give (o-nitrophenylsulphenyl)-cyclopeptide A (1 g.).

N % = 12.1 (theory : 12.6) S % = 2.85 (theory : 2.88)

Rf = 0.79 (silica gel : 1,2-dichloroethane-methanol, 8–2 by volume).

The following products are prepared in the same manner, starting with appropriate starting materials:
(1-dimethylamino-5-naphthalenesulphonyl)cyclopeptide A N % = 11.66 (theory : 11.75) S % = 2.69 (theory : 2.69 )

Rf = 0.70 (silica gel : 1,2-dichloroethane-methanol, 8–2 by volume).

toluene-p-sulphonyl-cyclopeptide A

N % = 11.10 (theory : 11.33) S % = 2.56 (theory : 2.88)

Rf = 0.74 (silica gel : 1,2-dichloroethane-methanol, 8–2 by volume).

p-acetylaminobenzenesulphonyl-cyclopeptide A

N % = 11.71 (theory : 12.12) S % = 2.93 (theory : 2.77)

Rf = 0.82 (silica gel : 1,2-dichloroethane-methanol, 8–2 by volume).

EXAMPLE 10

(N-α-Acetyl-N-γ-benzyloxycarbonyl-L-lysyl)-cyclopeptide A (863 mg.), prepared as described in Example 2, is dissolved in methanol (25 cc.). Palladium on charcoal (863 mg.; containing 3 percent of active metal) is added. The mixture is hydrogenated with violent agitation for 2 hours at 20° C. and under a pressure of 760 mm.Hg.

The resulting solution is filtered and the precipitate is washed with 0.5N hydrochloric acid (10 cc.). The filtrate and the washing liquors are combined and evaporated to dryness under reduced pressure (25 mm.Hg) in a rotating evaporator. The residue is dissolved in acetone (5 cc.) and the product is precipitated by adding ice-cold ether (50 cc.). After cooling for three hours at +4° C., the precipitate is filtered off, washed with ether and then dried for 18 hours under reduced pressure (0.3 mm.Hg) in the presence of phosphorous pentoxide to give (N-α-acetyl-L-lysyl)-cyclopeptide A (0.46 g.) in a 57.6 percent yield.

N % = 13.0 (theory : 13.23)

[α9$_D^{20}$ = −77.2° (c = 0.5, methanol)

Rf = 0.56 (silica gel : 1,2-dichloroethane-methanol, 1–1 by volume).

The following products are prepared in the same manner, starting with appropriate starting materials:

L-valyl-cyclopeptide A methanesulphonate

N % = 11.83 (theory : 12.14)

Rf = 0.55 (silica gel : 1,2-dichloroethane-methanol, 65–35 by volume).

(N-α-L(+)-6-methyloctanoyl-L-α,γ-diaminobutyryl-L-threonyl-L-α,γ-diaminobutyryl)-cyclopeptide A hydrochloride Cl % = 5.08 (theory : 4,81)

Rf = 0.14 (silica gel : 1,2-dichloroethane-methanol, 1–1 by volume).

(N-α-L(+)-6-methyloctanoyl-L-α,γ-diaminobutyryl-L-threonyl-L-α,γ-diamino-butyryl-N-methyl-L-valyl)-cyclopeptide A hydrochloride N % = 13.37 (theory : 13.25) Cl % = 4.47 (theory : 4.47)

Rf = 0.05 (silica gel : 1,2-dichloroethane-methanol, 1–1 by volume).

(N-α-palmitoyl-L-lysyl)-cyclopeptide A

N % = 10.9 (theory : 11.3)

Rf = 0.14 (silica gel : 1,2-dichloroethane-methanol, 8–2 by volume).

(N-α-pelargonyl-L-lysyl)-cyclopeptide A hydrochloride

N % = 12.20 (theory : 12.19) Cl % = 2.95 theory : 2.81)

Rf = 0.08 (silica gel : 1,2-dichloroethane-methanol, 8–2 by volume).

(N-α-L(+)-6-methyloctanoyl-L-α,γ-diaminobutyryl)-cyclopeptide A hydrochloride

N % = 12.27 (theory : 12.48)

Rf = 0.40 (silica gel : 1,2-dichloroethane-methanol, 8–2 by volume).

(N-methyl-p-dimethylamino-DL-phenylalanyl)-cyclopeptide A

N % = 13.05 (theory : 13.25)

Rf = 0.5 (silica gel : 1,2-dichloroethane-methanol, 8–2 by volume).

EXAMPLE 11

(4-p-Methoxybenzyloxycarbonylamino-cyclohexylcarbonyl)-cyclopeptide A (0.5 g.), prepared by the method of Example 2, is dissolved in dioxan (10 cc.); a 4N solution of anhydrous hydrogen chloride in dioxan (0.25 cc.) is added and the resulting solution is stirred for 18 hours. The solvent is removed under reduced pressure (30 mm.Hg) at 35° C. and the residue is taken up in ethyl acetate (20 cc.). The resulting solution is washed with water (20 cc.) and the organic phase is decanted and evaporated to dryness under reduced pressure (30 mm.Hg) at 35° C.

The residue is taken up in dioxan (10 cc.) and treated with a 4N solution of anhydrous hydrogen chloride in dioxan (0.84 cc.) over a period of 4 hours. The solvent is removed under reduced pressure (30 mm.Hg) at 35° C. and the residue is taken up in ethyl acetate (20 cc.). The solution is washed with water (20 cc.). The aqueous phase is decanted and added to the aqueous phase obtained during the first treatment. The mixture is concentrated to dryness under reduced pressure (0.3 mm.Hg) at 35° C. The residue is taken up in water (10 cc.), a slight amount of insoluble matter is filtered off and the filtrate is evaporated to dryness under reduced pressure as above. The residue is taken up in water (10 cc.) and lyophilised. (4-Amino-cyclohexylcarbonyl)-cyclopeptide A (0.355 g.) is thus obtained in a 78 percent yield.

N % = 12.75 (theory : 12.51)

Rf = 0.43 (silica gel : 1,2-dichloroethane methanol, 8–2 by volume).

EXAMPLE 12

Cyclopeptide A (10 g.) is dissolved in methylene chloride (200 cc.) and triethylamine (1.4 cc.) is added. The solution thus obtained is cooled to −5° C. and thereafter an ice-cold solution of trichloroacetyl chloride (1.81 g.) in methylene chloride (20 cc.) is added over the course of 10 minutes. The reaction mixture is stirred for 2 hours at −5° C. and then for 18 hours at ambient temperature. The solvent is removed by distillation under reduced pressure (30 mm.Hg) at 50° C. and the residue is taken up in ethyl acetate (100 cc.). Insoluble matter is filtered off and the filtrate is successively washed with an ice-cold 5 percent solution of sodium bicarbonate (2 ×75 cc.), with N hydrochloric acid (2 × 75 cc.) and then with a saturated solution of sodium chloride (30 cc.). The organic phase is dried over sodium sulphate, filtered, and the filtrate concentrated to dryness under reduced pressure (30 mm.Hg) at 50° C. A crude product (7.23 g.) is thus obtained which is taken up in ethyl acetate (20 cc.) and charged into a column 2 cm. in diameter containing silica gel (125 g.). Elution is effected with ethyl acetate. The product is recovered in the fractions between 150 and 450 cc. of eluate after removing the solvent under reduced pressure (30 mm.Hg) at 50° C. After drying at 30° C. under reduced pressure (0.1 mm.Hg), trichloroacetyl-cyclopeptide A (6 g.) is obtained in a 53 percent yield.

N % = 10.9 (theory : 11.13)

Rf = 0.8 (silica gel : 1,2-dichloroethane-methanol, 65–35 by volume).

EXAMPLE 13

N-Dodecyl-N-methyl-D-valine (65 g.) is dissolved in methylene chloride (800 cc.) and triethylamine (51 cc.) is added. The reaction mixture is cooled in an ice-bath, and cyclopeptide A (182 g.) is added followed by dicyclohexylcarbodiimide (42.5 g.). After stirring for 18 hours at 2° C. and then for 48 hours at a temperature of about 20° C., glacial acetic acid (5 cc.) is added and the precipitate formed is filtered off. The filtrate is concentrated to dryness under reduced pressure (25 mm.Hg) and the residue is taken up in ethyl acetate (500 cc.); the resulting suspension is kept in an ice-bath for 30 minutes and the insoluble matter filtered off. The filtrate is concentrated to dryness under reduced pressure (25 mm.Hg).

The crude product thus obtained is purified by chromatography. For this purpose a solution of the crude product in ethyl acetate (500 cc.) is poured through a column 10 cm. in diameter containing silica (2 kg.). Elution is effected with mixtures of ethyl acetate-methanol with increasing proportions of methanol. Fractions of 300 cc. are collected. The fractions eluted with the ethyl acetate-methanol mixture (98–2, by volume) are combined and then concentrated to dryness under reduced pressure (25 mm.Hg). The product obtained is taken up in water (900 cc.), acidified to pH 1 by the addition of N hydrochloric acid and stirred for 2 hours until dissolution is complete. The solution is concentrated to dryness under reduced pressure (0.3 mm.Hg) to remove the excess hydrochloric acid, and the residue is taken up in water (500 cc.) and concentrated to dryness under reduced pressure (0.3 mm.Hg). The residue is taken up in water (900 cc.) and lyophilised to give (N-dodecyl-N-methyl-D-valyl)-cyclopeptide A hydrochloride (74 g.).

| | |
|---|---|
| C % = 62.7 | (theory: 63.06) |
| H % = 9.25 | (theory: 9.25) |
| CL % = 2.6 | (theory: 2.77) |
| Rf = 0.51 | (silica gel: 1,2-dichloroethane-methanol, 8–2 by volume) |

EXAMPLE 14

The procedure of Example 13 is followed but using N-undecyl-N-methyl-D-valine (1.75 g.) in methylene chloride (110 cc.), triethyl-amine (1.52 cc.), cyclopeptide A (5.4 g.) and dicyclohexylcarbodiimide (1.12 g.). After chromatography through a column containing silica (120 g.), there is obtained (N-undecyl-N-methyl-D-valyl)-cyclopeptide A (1.83 g.).

| | |
|---|---|
| C % = 64.0 | (theory: 64.68) |
| H % = 9.09 | (theory: 9.54) |
| N % = 11.1 | (theory: 11.43) |
| Rf = 0.63 | (silica gel: 1,2-dichloroethane-methanol, 8–2 by volume) |

EXAMPLE 15

The procedure of Example 13 is followed but using N-tetradecyl-N-methyl-D-valine (4.8 g.) in methylene chloride (27 cc.), triethylamine (2.4 cc.), cyclopeptide A (10.3 g.) and dicyclohexylcarbodiimide (2.09 g.). After purification of the crude product by chromatography through a column containing silica (100 g.) and transformation into the hydrochloride, there is obtained (N-tetradecyl-N-methyl-D-valyl)-cyclopeptide A hydrochloride (2 g.).

| | |
|---|---|
| N % = 10.5 | (theory: 10.73) |
| Cl % = 2.56 | (theory: 2.71) |
| Rf = 0.68 | (silica gel: 1,2-dichloroethane-methanol, 8–2 by volume) |

EXAMPLE 16

The procedure of Example 13 is followed but using N-tridecyl-N-methyl-D-valine (1.4 g.) in ethyl acetate (80 cc.), triethylamine (1.12 cc.), cyclopeptide A (4 g.) and dicyclohexylcarbodiimide (0.9 g.). After purification of the crude product by chromatography through a column containing silica (50 g.) and transformation into the hydrochloride, there is obtained (N-tridecyl-N-methyl-D-valyl)-cyclopeptide A hydrochloride (0.48 g.).

| | |
|---|---|
| N % = 10.32 | (theory: 10.85) |
| Cl % = 2.77 | (theory: 2.82) |
| Rf = 0.75 | (silica gel: 1,2-dichloroethane-methanol, 8–2 by volume). |

The present invention further includes within its scope pharmaceutical compositions which comprise at least one cyclopeptide of general formula I, or a non-toxic acid addition or quaternary ammonium salt thereof, in association with a pharmaceutical carrier or coating. The invention includes especially such compositions made up for oral, parenteral or rectal administration, or as an ointment.

Solid compositions for oral administration include compressed tablets, pills, dispersible powders and granules. In such solid compositions one or more of the active substances is or are admixed with at least one inert diluent such as sucrose, lactose, or a starch. The compositions may also comprise, as is normal practice, additional substances other than inert diluents, e.g., lubricating agents such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavoring and perfuming agents.

The compositions according to the invention for oral administration also include capsules of absorbable material such as gelatin containing one or more of the active substances with or without the addition of diluents or excipients.

Preparations according to the invention for parenteral administration include sterile aqueous or non-aqueous solutions, suspensions, or emulsions. Examples of suitable non-aqueous media are propylene glycol, polyethylene glycol, vegetable oils such as olive oil, and injectable organic esters such as ethyl oleate. These compositions may also contain adjuvants such as wetting, emulsifying and dispersing agents. They may be sterilized by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The compositions for rectal administration are suppositories which contain, in addition to the active substance, excipients such as cacao butter or suppository wax.

The percentage of active ingredient in the compositions of the invention may be varied, it being necessary that it should constitute a proportion such that a suitable dosage shall be obtained. Obviously several unit dosage forms may be administered at about the same time. The dose employed depends upon the desired therapeutic effect, the route of administration and the duration of the treatment. The dose can be between 2 and 500 mg. per kilogramme animal body weight. In human therapy, the daily dose is generally between 0.1 and 10 g. of active product.

The following Example illustrates pharmaceutical compositions according to the present invention.

EXAMPLE 17

Tablets are prepared in the usual way having the following composition:

| | |
|---|---|
| (N-benzyl-N-methyl-DL-valyl)-cyclopeptide A methanesulphonate | 0.500 g. |
| wheat starch | 0.150 g. |
| colloidal silica | 0.040 g. |
| magnesium stearate | 0.010 g. |

In the treatment of tuberculosis the medicament is administered, preferably orally, at doses generally between 1 and 10 g. per day.

I claim:

1. A cyclopeptide of the formula:

```
R'—L-trans-4-methyl-proline-L-N-methyl-threonine————L-leucine
                           |                              |
                           O                              |
                           |                              |
                        glycine              L-trans-4-methyl-proline
                           |                              |
                   D-N-methyl-leucine                  L-leucine
                           |                              |
                      L-proline————————L-N-methyl-valine
``` wherein R' is N-benzyl-N-methyl-L-valyl, N-benzyl-sarcosyl, N-benzyl-N-methyl-L-methionyl, N-hexyl-N-methyl-L-valyl, N-dodecyl-N-methyl-D-valyl, N-undecyl-N-methyl-D-valyl, N-tetradecyl-N-methyl-D-valyl, or N-tridecyl-N-methyl-D-valyl, and its non-toxic acid addition salts.

2. A cyclopeptide according to claim 1 wherein R' is N-benzyl-N-methyl-L-valyl, and its non-toxic acid addition salts.

3. A cyclopeptide according to claim 1 wherein R' is N-benzyl-N-methyl-L-methionyl, and its non-toxic acid addition salts.

4. A cyclopeptide according to claim 1 wherein R' is N-dodecyl-N-methyl-D-valyl, and its non-toxic acid addition salts.

* * * * *

UNITED STATES PATENT OFFICE
CERTIFICATE OF CORRECTION

Patent No. 3,719,656          Dated March 6, 1973

Inventor(s) GEORGES JOLLES

It is certified that error appears in the above-identified patent and that said Letters Patent are hereby corrected as shown below:

In the heading at [30], the "Foreign Application Priority Data", for the number of the second French application "68,44421", read -- 68144421--; for the data for the third foreign application, read -- Nov. 12,1969  Belgium ...... 6981425--.

Signed and sealed this 13th day of November 1973.

(SEAL)
Attest:

EDWARD M. FLETCHER, JR.
Attesting Officer

RENE D. TEGTMEYER
Acting Commissioner of Patents